United States Patent
Guo et al.

(10) Patent No.: US 10,544,353 B2
(45) Date of Patent: Jan. 28, 2020

(54) SURFACTANT THAT CHANGES THE WETTABILITY OF TIGHT SANDSTONE AND ITS PREPARATION METHOD AND APPLICATION

(71) Applicant: PetroChina Company Limited, Beijing (CN)

(72) Inventors: Gang Guo, Beijing (CN); Zhongxing Li, Beijing (CN); Lijun Mu, Beijing (CN); Zhenfeng Zhao, Beijing (CN); Kuangsheng Zhang, Beijing (CN); Xiaojia Xue, Beijing (CN); Jiang Wu, Beijing (CN); Kai Li, Beijing (CN); Huabo Fan, Beijing (CN); Jin Liu, Beijing (CN); Xiaoqun Zhou, Beijing (CN); Cheng Xian, Beijing (CN)

(73) Assignee: PetroChina Company Ltd. (CN)

( * ) Notice: Subject to any disclaimer, the term of this patent is extended or adjusted under 35 U.S.C. 154(b) by 0 days.

(21) Appl. No.: 15/956,617

(22) Filed: Apr. 18, 2018

(65) Prior Publication Data

US 2019/0031945 A1 Jan. 31, 2019

(30) Foreign Application Priority Data

Jul. 28, 2017 (CN) .......................... 2017 1 0631817

(51) Int. Cl.
| | |
|---|---|
| *C09K 8/584* | (2006.01) |
| *C09K 8/36* | (2006.01) |
| *C09K 8/60* | (2006.01) |

(52) U.S. Cl.
CPC ................ *C09K 8/584* (2013.01); *C09K 8/36* (2013.01); *C09K 8/604* (2013.01); *C09K 2208/30* (2013.01)

(58) Field of Classification Search
CPC .......... C09K 8/584; C09K 8/36; C09K 8/604; C09K 8/68; C09K 8/88; C09K 2208/30
See application file for complete search history.

(56) References Cited

U.S. PATENT DOCUMENTS

| | | | |
|---|---|---|---|
| 8,662,173 B2* | 3/2014 | Zhou | C09K 8/5045 166/270 |
| 9,702,234 B2* | 7/2017 | Huang | E21B 43/16 |

(Continued)

FOREIGN PATENT DOCUMENTS

| | | |
|---|---|---|
| CN | 101838528 A | 9/2010 |
| CN | 102020980 A | 4/2011 |

(Continued)

OTHER PUBLICATIONS

First Office Action and search report dated Jul. 2, 2019 for counterpart Chinese patent application No. 201710631817.2, along with EN translation.

*Primary Examiner* — Zakiya W Bates
*Assistant Examiner* — Crystal J Miller
(74) *Attorney, Agent, or Firm* — Weaver Austin Villeneuve & Sampson LLP

(57) ABSTRACT

A surfactant that changes the wettability of tight sandstone and its preparation method and application. By adding the aqueous phase solution into the oil phase solution, and under the action of the emulsifier, a uniformly dispersed phase is achieved. Then adding initiator, stirring and raising the temperature, reacting the reaction at the temperature to obtain a colorless and transparent liquid, i.e., high polymer. At room temperature, adding fluorocarbon surfactant and biosurfactant and stirring was continued for 4 hours to obtain a surfactant that changes the surface wettability of tight sandstone. The surfactant of the present invention can reduce the oil-water interfacial tension, transform the oil-wet surface into water-wet surface, which reduces the adhesion of oil droplets to rock surface and improves the flowability of crude oil in the original stratum, and improves the recovery of low-permeability reservoir.

8 Claims, 1 Drawing Sheet

(56) References Cited

U.S. PATENT DOCUMENTS

| | | | | |
|---|---|---|---|---|
| 10,081,752 | B2* | 9/2018 | Wu | C09K 8/882 |
| 10,081,753 | B2* | 9/2018 | Wu | C09K 8/05 |
| 2012/0255728 | A1* | 10/2012 | Zhou | C09K 8/5045 |
| | | | | 166/270 |
| 2014/0262297 | A1* | 9/2014 | Huang | E21B 43/16 |
| | | | | 166/309 |
| 2016/0069159 | A1* | 3/2016 | Teklu | C09K 8/52 |
| | | | | 166/305.1 |
| 2016/0347989 | A1* | 12/2016 | Duan | C09K 8/584 |
| 2017/0037301 | A1* | 2/2017 | Alwattari | C09K 8/035 |
| 2017/0362489 | A1* | 12/2017 | Jackson | C09K 8/584 |
| 2018/0112117 | A1* | 4/2018 | Wu | C09K 8/882 |
| 2018/0112118 | A1* | 4/2018 | Wu | C09K 8/05 |
| 2018/0112119 | A1* | 4/2018 | Wu | C08F 2/44 |
| 2018/0112125 | A1* | 4/2018 | Wu | C09K 8/665 |
| 2018/0272396 | A1* | 9/2018 | Farmer | C12Q 1/689 |
| 2019/0023973 | A1* | 1/2019 | Sayed | C09K 8/584 |

FOREIGN PATENT DOCUMENTS

| | | | |
|---|---|---|---|
| CN | 102492412 | A | 6/2012 |
| CN | 103215020 | A | 7/2013 |
| CN | 103555309 | A | 2/2014 |
| CN | 103589416 | A | 2/2014 |
| CN | 103820096 | A | 5/2014 |
| CN | 104448127 | A | 3/2015 |
| CN | 104650824 | A | 5/2015 |
| CN | 106634935 | A | 5/2017 |

* cited by examiner

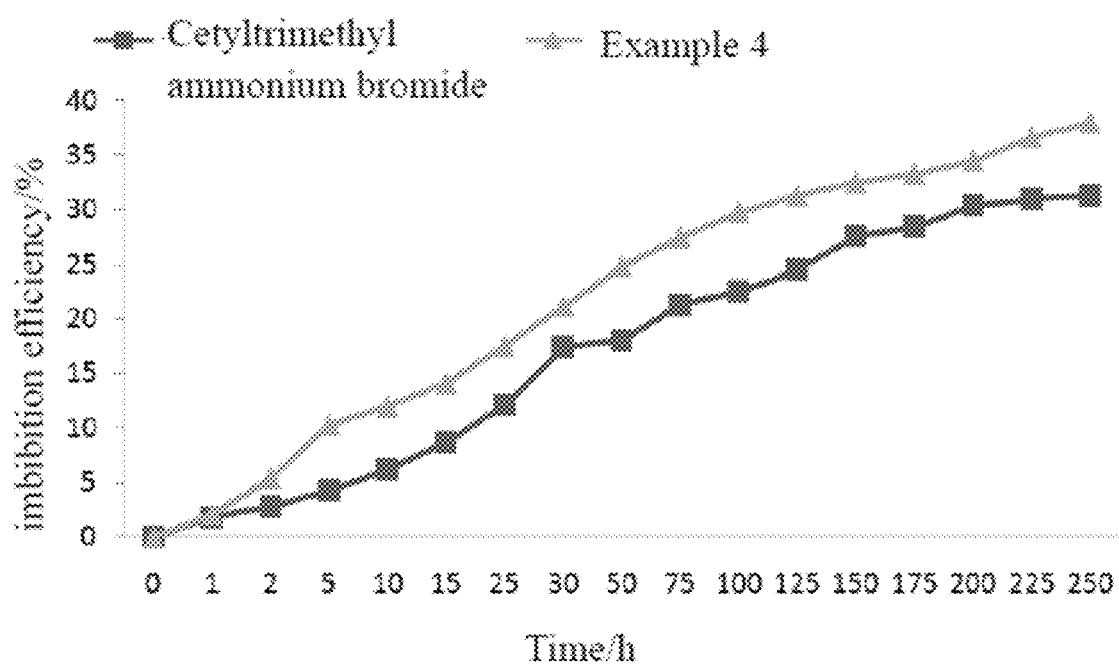

SURFACTANT THAT CHANGES THE WETTABILITY OF TIGHT SANDSTONE AND ITS PREPARATION METHOD AND APPLICATION

CROSS-REFERENCE TO RELATED APPLICATION

This application claims priority to Chinese Patent Application No. 201710631817.2, filed on Jul. 28, 2017, which is hereby incorporated by reference in its entirety.

TECHNICAL FIELD

The present invention relates to the field of petroleum extraction, and more particularly to a surfactant that changes the wettability of tight sandstone and its preparation method and application.

BACKGROUND

Note that the points discussed below are not necessarily admitted to be prior art.

China is rich in tight oil and gas resources. With the continuous improvement of exploration and development technology, especially the breakthrough of horizontal well volumetric fracturing technology, the pilot test of the tight oil development has been conducted in Changqing Oilfield, Daqing Oilfield, Tuha Oilfield and the like. Horizontal well volumetric fracturing has become the core technologies for the development of tight reservoirs, but their utilization of reservoirs is still limited. According to geological analysis, the rock wettability of tight reservoirs is generally neutral-lipophilic reservoirs. Rock wettability is one of the important factors that control the oil-water distribution, quantity and flow-driven-displacement mechanism in the reservoir. The change of wettability directly affects the capillary pressure, oil-water relative permeability, water-driven state, the number of bound phases and the distribution of residual oil saturation of the reservoir and the electrical characteristics of the reservoir. Therefore, changing the wettability of the reservoir is one of the reliable methods of increasing the mobilization capacity of the reservoir and crude oil recovery.

Wettability inversing agents that change reservoir wettability are commonly used to increase waterflooding, reduce waterflood pressure, and indirectly increase oil recovery by increasing stratum pressure during oilfield development. At the same time, there are mainly three kinds of wettability inversing surfactants for oilfields in domestic and foreign research: (1) cationic surfactants, the most commonly used is alkyl trimethyl ammonium bromide (CTAB); (2) anionic surfactants, mainly is polyoxyethylene (propylene) alkyl alcohol ether sulfate ester salt or sulfonate; (3) non-ionic surfactants, mainly polyoxyethylene alkyl phenol ethers. Among them, quaternary ammonium surfactants (such as CTAB) will make oil-wet reservoirs and thus reduce the relative permeability of hydrocarbons in rocks. Anions (such as petroleum sulfonate) have poor salt-tolerance ability, high critical micelle concentration, and high loss due to interaction with multivalent ions in the stratum; non-ionic surfactant in the stratum has a poor stability, poor high temperature resistance and high prices.

SUMMARY

In view of the above existing problems in the prior art, an object of the present invention is to provide a surfactant that changes the surface wettability of tight sandstone and its preparation method and application. The surfactant prepared by the method is used for the fracturing fluid and has the advantages of long-lasting property, low interfacial tension and high contact angle, and the adaptability to the stratum, which can change the wettability of the tight sandstone. It exists in the unflowback fracturing fluid retentive in the stratum, and acts on the surface of tight sandstone, which can reduce the interfacial tension between oil and water, and transforms the oil-wet surface into water-wet surface. It reduce the adhesion of oil droplets to rock surface and improve the flowability of crude oil in the original stratum, and improve the recovery of low-permeability reservoir.

In order to achieve the above object, the following technical solutions are used in the present invention.

In one aspect, the present invention provides a method for preparing a surfactant that changes the wettability of tight sandstone, comprising the following steps:

1) mixing 1 to 3 parts by weight of emulsifier with 30 to 40 parts by weight of solvent oil to prepare an oil phase solvent, adding 5 to 8 parts by weight of modified lignosulphonate monomer into the oil phase solvent to prepare an oil phase mixed solution;

2) adding 15 to 25 parts by weight of hydrophilic cationic monomer and 7 to 10 parts by weight of non-ionic monomer into 50 to 60 parts by weight of water, stirring and dissolving, adjusting the pH value to 8.5 to 9.5 to obtain an aqueous phase solution;

3) adding the aqueous phase solution into the oil phase mixed solution, and then adding 0.10 to 0.15 parts by weight of an initiator therein to cause a polymerization to obtain a high polymer; wherein the mass ratio of the aqueous phase solution to the oil phase mixed solution is 1:(2 to 2.5);

4) mixing 32 to 56 parts by weight of fluorocarbon surfactant and 15 to 23 parts by weight of biosurfactant to obtain a surfactant system;

5) adding 40 to 55 parts by weight of the surfactant system into 30 to 43 parts by weight of the high polymer, and stirring the mixture uniformly to obtain the surfactant that changes the wettability of tight sandstone.

In other aspect, the present invention provides a surfactant that changes the wettability of tight sandstone according to the above method.

In other aspect, the present invention provides a use of the above surfactant.

BRIEF DESCRIPTION OF DRAWINGS

FIG. 1 shows imbibition efficiency of different surfactant solution.

DETAILED DESCRIPTION

In one aspect, the present invention provides a method for preparing a surfactant that changes the wettability of tight sandstone, comprising the following steps:

1) mixing 1 to 3 parts by weight of emulsifier with 30 to 40 parts by weight of solvent oil to prepare an oil phase solvent, adding 5 to 8 parts by weight of modified lignosulphonate monomer into the oil phase solvent to prepare an oil phase mixed solution;

2) adding 15 to 25 parts by weight of hydrophilic cationic monomer and 7 to 10 parts by weight of non-ionic monomer into 50 to 60 parts by weight of water, stirring and dissolving, adjusting the pH value to 8.5 to 9.5 to obtain an aqueous phase solution;

3) adding the aqueous phase solution into the oil phase mixed solution, and then adding 0.10 to 0.15 parts by weight of an initiator therein to cause a polymerization to obtain a high polymer; wherein the mass ratio of the aqueous phase solution to the oil phase mixed solution is 1:(2 to 2.5);

4) mixing 32 to 56 parts by weight of fluorocarbon surfactant and 15 to 23 parts by weight of biosurfactant to obtain a surfactant system;

5) adding 40 to 55 parts by weight of the surfactant system into 30 to 43 parts by weight of the high polymer, and stirring the mixture uniformly to obtain the surfactant that changes the wettability of tight sandstone.

A further improvement of the present invention is that the polymerization reaction has a temperature of 60 to 75° C. and a duration of 12 to 18 hours.

A further improvement of the present invention is that the emulsifier is one or more of fatty acid monoglyceride, lauric acid monoglyceride, propylene glycol fatty acid ester and the like; the solvent oil is one or more of white oil, naphtha, propanol, isopropanol and the like.

A further improvement of the present invention is that the modified lignosulphonate monomer is sodium hydroxymethyl lignosulphonate, sodium sulfomethylated lignosulphonate, calcium hydroxymethyllated lignosulphonate, 2-acrylamido-2-methylpropanesulfonic acid and the like.

A further improvement of the present invention is that the hydrophilic cationic monomer is one or more of octylphenol polyoxyethylene ether sodium sulfate, nonylphenol polyoxyethylene ether, amido polyoxyethylene ether magnesium disulfate, dodecyl alcohol polyoxyethylene ether sodium disulfate and the like.

A further improvement of the present invention is that the non-ionic monomer is one or more of polyoxyethylene glyceryl ether, polyoxypropylene glyceryl ether, methyl polyoxyethylene ether and the like.

A further improvement of the present invention is that the initiator is one or more of benzoyl peroxide, benzoyl t-butyl peroxide, azobisisobutyronitrile, azobisisoheptonitrile, dimethyl azobisisobutyrate and the like.

A further improvement of the present invention is that the fluorocarbon surfactant is one or more of ethyldimethylammonium 3-polyepoxyhexafluoropropaneamidopropyl (2-sulfite), sodium perfluoropropylalkylsulfonate, perfluoroalkyl carboxylic acid amide alkyl carboxylic acid sodium, perfluorooctane sulfonic acid tetraethylamine amide and the like; the biosurfactant is one or more of sophorolipid, rhamnolipid, trehalose lipid and the like.

In other aspect, the present invention provides a surfactant that changes the wettability of tight sandstone, with the surface tension of $10^{-4}$ to $10^{-5}$ mN/m, a contact angle of 55°.

In other aspect, the present invention provides a use of the surfactant that changes the wettability of tight sandstone in the preparation of fracturing fluid.

Compared with the prior art, the beneficial effects of the present invention lie in:

1. In the invention, by adding the aqueous phase solution into the oil phase solution, and under the action of the emulsifier for 1 to 2 hours, the uniformly dispersed phase is achieved. Then adding initiator, stirring and raising the temperature to 60 to 75° C., reacting the reaction at this temperature for 12 to 18 hours to obtain a colorless and transparent liquid, i.e, high polymer. At room temperature, adding fluorocarbon surfactant and biosurfactant and stirring was continued for 4 hours to obtain a surfactant that changes the surface wettability of tight sandstone. The obtained surfactant that changes the wettability of tight sandstone can reduce the oil-water interfacial tension and can transform the oil-wet surface into a water-wet surface, reduce the adhesion of the oil droplets to the rock surface, improve the flowability of the crude oil in the original stratum and improve the recovery of the low-permeability reservoir.

2. The preparation method of the surfactant that changes the wettability of the tight sandstone according to the present invention is simple and easy to implement, the raw materials used are all conventional and readily available chemical materials.

3. The surfactant that changes the wettability of the tight sandstone according to the present invention can be added into the stratum as a fracturing fluid additive, which acts on the surface of the sandstone along with the fracturing fluid retentive in the stratum.

4. The contact angle of the surfactant that changes the wettability of the tight sandstone according to the present invention with the sandstone surface is up to 55°, the interfacial tension is $10^{-4}$ to $10^{-5}$ mN/m.

Further, due to the addition of temperature-resistant and salt-resistant groups (mainly 2-acrylamido-2-methylpropanesulfonic acid (AMPS)), when the small molecule electrolyte (mainly refers to the small molecule ions in water, including some ions that impacting formulated solution such as calcium and magnesium herein) is added to the high polymer solution, the charge on the ionic groups of the high polymer is shielded, the electrostatic repulsion between the ions is weakened, the long chain of polymer curls, and the viscosity decreases macroscopically. As the divalent ions easily complex with carboxylate in solution and even form precipitate, which leads to the decrease of viscosity, by introducing AMPS, an anionic monomer with sulfonate groups, the divalent ions can be effectively complexed so that the molecules in the solution can effectively extend to obtain a higher viscosity retention. The surfactant that changes the wettability of the tight sandstone according to the present invention can be used in the oil zone with the stratum temperature less than 80° C. and can be used in the fracturing liquid water with the mineralization degree of less than or equal to 30000 mg/L.

The present invention will be described in detail by the following specific Examples.

In the invention, by adding the aqueous phase solution into the oil phase solution, and the under the action of the emulsifier for 1 to 2 hours, the uniformly dispersed phase is achieved. Then adding initiator, stirring and raising the temperature to 60 to 75° C., reacting the reaction at this temperature for 12 to 18 hours to obtain a colorless and transparent liquid, i.e, high polymer. At room temperature, adding fluorocarbon surfactant and biosurfactant and stirring was continued for 4 hours to obtain a surfactant that changes the surface wettability of tight sandstone.

Example 1

1) mixing 1 part by weight of lauric acid monoglyceride with 32 parts by weight of white oil to prepare an oil phase solvent, and then adding 5 parts by weight of sodium sulfomethylated lignosulfonate therein to prepare an oil phase mixed solution;

2) adding 23 parts by weight of amido polyoxyethylene ether magnesium disulfate and 8 parts by weight of methyl polyoxyethylene ether into 51 parts by weight of water and stirring until dissolved, adjusting the pH to 9.2, to obtain an aqueous phase solution;

3) adding the aqueous phase solution into the oil phase mixed solution, and then adding 0.13 parts by weight of azobisisoheptanonitrile to cause the polymerization, stirring and raising the temperature to 70° C. and reacting the reaction for 17 hours at the temperature to obtain a high polymer; wherein the mass ratio of the aqueous phase solution to the oil phase mixed solution is 1:2.2;

4) mixing 50 parts by weight of ethyldimethylammonium 3-polyepoxyhexafluoropropaneamidopropyl (2-sulfite) and 17 parts by weight of rhamnolipid to obtain a surfactant system;

5) adding 50 parts by weight of the surfactant system in batches into 31 parts by weight of the high polymer, and stirring the mixture for 4 hours at room temperature to prepare a surfactant that changes the surface wettability of the tight sandstone.

Example 2

1) mixing 3 parts by weight of propylene glycol fatty acid ester with 31 parts by weight of isopropanol to prepare an oil phase solvent, and then adding 5 parts by weight of calcium hydroxymethyllated lignosulphonate therein to prepare an oil phase mixed solution;

2) adding 18 parts by weight of octylphenol polyoxyethylene ether sodium sulfate and 9 parts by weight of polyoxyethylene glyceryl ether into 58 parts by weight of water and stirring until dissolved, adjusting the pH to 8.8, to obtain an aqueous phase solution;

3) adding the aqueous phase solution into the oil phase mixed solution, and then adding 0.10 parts by weight of benzoyl peroxide to cause the polymerization, stirring and raising the temperature to 60° C. and reacting for 15 hours at the temperature to obtain a high polymer; wherein the mass ratio of the aqueous phase solution to the oil phase mixed solution is 1:2.5;

4) mixing 38 parts by weight of ethyldimethylammonium 3-polyepoxyhexafluoropropaneamidopropyl (2-sulfite) with 22 parts by weight of sophorolipid to obtain a surfactant system;

5) adding 42 parts by weight of the surfactant system in batches into 41 parts by weight of the high polymer, and stirring for 4 hours at room temperature to prepare a surfactant that changes the surface wettability of the tight sandstone.

Example 3

1) mixing 2 parts by weight of lauric acid monoglyceride with 40 parts by weight of naphtha to prepare an oil phase solvent, and then adding 8 parts by weight of calcium hydroxymethyllated lignosulphonate therein to prepare an oil phase mixed solution;

2) adding 16 parts by weight of dodecyl alcohol polyoxyethylene ether sodium disulfate and 7 parts by weight of polyoxypropylene glyceryl ether into 55 parts by weight of water and stirring until dissolved, adjusting the pH to 8.5, to obtain an aqueous phase solution;

3) adding the aqueous phase solution into the oil phase mixed solution, and then adding 0.15 parts by weight of benzoyl t-butyl peroxide to cause the polymerization, stirring and raising the temperature to 65° C. and reacting the reaction for 18 hours at the temperature to obtain a high polymer; wherein the mass ratio of the aqueous phase solution to the oil phase mixed solution is 1:2;

4) mixing 45 parts by weight of sodium perfluoropropylalkylsulfonate with 20 parts by weight of rhamnolipid to obtain a surfactant system;

5) adding 51 parts by weight of the surfactant system in batches into 39 parts by weight of the high polymer, and stirring the mixture for 4 hours at room temperature to prepare a surfactant that changes the surface wettability of the tight sandstone.

Example 4

1) mixing 1.5 parts by weight of emulsifier with 30 parts by weight of solvent oil to prepare an oil phase solvent, and then adding 6 parts by weight of 2-acrylamido-2-methylpropanesulfonic acid therein to prepare an oil phase mixed solution; wherein, the emulsifier is the mixture of fatty acid monoglyceride and lauric acid monoglyceride, and the solvent is the mixture of white oil and propanol.

2) adding 15 parts by weight of hydrophilic cationic monomer and 10 parts by weight of non-ionic monomer into 60 parts by weight of water and stirring until dissolved, adjusting the pH to 9.0 to obtain an aqueous phase solution; wherein the hydrophilic cationic monomer is sodium octylphenol polyoxyethylene ether sulfate, the non-ionic monomer is polyoxyethylene glyceryl ether.

3) adding the aqueous phase solution into the oil phase mixed solution, and then adding 0.12 parts by weight of initiator to cause a polymerization for 12 hours at the temperature of 75° C. to obtain a high polymer; wherein the mass ratio of the aqueous phase solution to the oil phase mixed solution is 1:2; wherein the initiator is the mixture of azobisisobutyronitrile and azobisisoheptanonitrile;

4) mixing 32 parts by weight of fluorocarbon surfactant with 15 parts by weight of biosurfactant to obtain a surfactant system; wherein the fluorocarbon surfactant is the mixture of perfluoroalkyl carboxylic acid amide alkyl carboxylic acid sodium (such as $C_8F_{17}CONH(CH_2)_5COONa$) and perfluorooctane sulfonic acid tetraethylamine amide; the biosurfactant is trehalose lipid;

5) adding 40 parts by weight of the surfactant system in batches into 30 parts by weight of the high polymer, and stirring uniformly to prepare a surfactant that changes the surface wettability of the tight sandstone.

Example 5

1) mixing 2.5 parts by weight of emulsifier with 35 parts by weight of solvent oil to prepare an oil phase solvent, and then adding 7 parts by weight of sodium hydroxymethyl lignosulphonate therein to prepare an oil phase mixed solution; wherein, the emulsifier is the mixture of fatty acid monoglyceride, lauric acid monoglyceride and propylene glycol fatty acid ester, the solvent is the mixture of naphtha, propanol and isopropanol.

2) adding 25 parts by weight of hydrophilic cationic monomer and 7 parts by weight of non-ionic monomer into 50 parts by weight of water and stirring until dissolved, adjusting the pH to 9.5 to obtain an aqueous phase solution; wherein the hydrophilic cationic monomer is the mixture of octylphenol polyoxyethylene ether sodium sulfate, nonylphenol polyoxyethylene ether and amido polyoxyethylene ether magnesium disulfate, the non-ionic monomer is the mixture of polyoxypropylene glyceryl ether and methyl polyoxyethylene ether.

3) adding the aqueous phase solution into the oil phase mixed solution, and then adding 0.15 parts by weight of initiator to cause a polymerization for 18 hours at the temperature of 62° C. to obtain a high polymer; wherein the mass ratio of the aqueous phase solution to the oil phase mixed solution is 1:2.4; wherein the initiator is the mixture of benzoyl peroxide and dimethyl azobisisobutyrate;

4) mixing 56 parts by weight of fluorocarbon surfactant with 23 parts by weight of biosurfactant to obtain a surfactant system; wherein the fluorocarbon surfactant is the mixture of ethyldimethylammonium 3-polyepoxyhexafluoropropaneamidopropyl (2-sulfite) and sodium perfluoropropylalkylsulfonate; the biosurfactant is the mixture of sophorolipid and rhamnolipid;

5) adding 55 parts by weight of the surfactant system in batches to 43 parts by weight of the high polymer, and stirring the mixture uniformly to prepare a surfactant that changes the surface wettability of the tight sandstone.

The synthetic surfactant that changes the surface wettability of the tight sandstone was observed on sandstone surface, and the contact angle was tested. As seen from Table 1, the contact angle can be 55.8°. It shows better performance compared with Domestic and foreign prior art products.

TABLE 1

Performance comparison of the surfactants that changes the surface wettability of the tight sandstone

| Sample type | Example 5 | sodium dodecyl benzene sulfonate |
|---|---|---|
| Mean of Interfacial tension σ | 0.26 | 0.62 |
| Mean of contact angle | 55.8 | 41.7 |

The wettability was measured by capillary rising method.

Capillary Specifications: Standard capillary inner diameter 0.35 mm (a) The capillary was processed by ultrasonic waves sequentially with carbon tetrachloride, and benzene:acetone:ethanol=7:1.5:1.5 (volume ratio) for 30 min to remove surface organic material;

(b) The capillary was processed by ultrasonic wave sequentially with the dilute hydrochloric acid solution (1:10), hydrofluoric acid solution (10%), so as to roughen and activate the surface of capillary for 30 minutes;

(c) The capillary was cleaned by ultrasonic wave with distilled water to remove residual acid, until pH>6.5, and dried at 105° C.;

the aging oil is formulated with a composition of crude oil:aviation kerosene: 90 # asphalt=2:5:3;

(d) The capillary treated in step c) is completely immersed in the aged oil and aged for 2 to 4 weeks at the temperature of 60° C.;

(e) The capillary was taken out and infiltrated with kerosene for 2 minutes, to wash the asphalt deposited on the inner and outer walls of the capillary to reach an extent of not affecting the observation;

(f) The kerosene outside the capillary tube was dried with nitrogen, and placed in a closed environment at 60° C. to obtain the oil wet capillary, ready for later use.

TABLE 2 lifting height data comparison of surfactant in capillary

| Medium | Water | Cetyl trimethyl ammonium bromide | Cocamido propyl hydroxy betaine | Sodium dodecyl benzene sulfonate | Example 1 |
|---|---|---|---|---|---|
| lifting height in capillary/cm | 0 | 1.5 | 1.3 | 0.3 | 3.1 |

Comparing the effect of different types of universal surfactants on the rising height in oil wet capillary, we found that the synthetic surfactant that changes the wettability of tight sandstone has the most obvious effect, and can turn the oil wet capillary into water wet capillary through wetting inversion.

Measuring wetting changes by contact angle measurement using hydrophobic slide (1) formulating different types of surfactant solution with a concentration of 0.2 wt %;

(2) Putting the hydrophobic slide on the instrument test platform, dropping distilled water by using the injector to the upper surface of the slide, and recording the initial data of contact angle;

(3) Immersing the hydrophobic slide in the surfactant solution, water and synthetic surfactant solution at a constant temperature of 60° C., keeping the test surface facing the same direction;

(4) After immersing for 24 h and 48 h, drying the slide surface with nitrogen gas, repeating step 2) and recording the data of contact angle;

TABLE 3

The contact angle of hydrophobic slide with water after immersing in different surfactants

| Immersing time | Water | Cetyltrimethyl ammonium bromide | Secondary Alkyl Sulphonate Sodium | Example 2 |
|---|---|---|---|---|
| 0 d | 102.11 | 126.41 | 113.48 | 128.92 |
| 3 d | 93.42 | 92.61 | 75.62 | 75.36 |

In the surfactant test results, Example 2 is the most effective.

Zeta Potential Test

The rock core is crushed with a solid grinder, sieved with a 300 mesh sieve to obtain a core particle with a diameter of less than or equal to 50 μm, which is then subjected to extraction to remove the impurity, and is stored in desiccator for later use. The core powder and the surfactant solution were mixed at a ratio of 10:90, allowed to stand for 2 hours, and then the Zeta potential was measured.

TABLE 4

Zeta potential test of the surfactant that changes the wettability of tight sandstone

| Medium | Water | Example 3 | |
|---|---|---|---|
| | | 0.1% | 0.3% |
| Sandstone | −10 | −45 | −48 |
| Quartz sand | −3 | −34 | −37 |

The results showed that the surfactant that changes the wettability of tight sandstone formed a stable adsorption hydration film on the surface of core, displaying a strong water wettability.

Imbibition Efficiency Measurement

The parameters of imbibition rate and imbibition recovery were introduced as evaluation parameters to compare the imbibition effect under different conditions by using the imbibition test device, according to the weighing method.

The surfactants that change the wettability of tight sandstone are better than other surfactants (the final imbibition of water under the same experimental conditions), with faster imbibition rate and higher imbibition efficiency.

What is claimed is:

1. A method for preparing a surfactant that changes the wettability of tight sandstone, wherein the method comprises:
   1) mixing 1 to 3 parts by weight of emulsifier with 30 to 40 parts by weight of solvent oil to prepare an oil phase solvent, adding 5 to 8 parts by weight of modified lignosulphonate monomer into the oil phase solvent to prepare an oil phase mixed solution;
   2) adding 15 to 25 parts by weight of hydrophilic cationic monomer and 7 to 10 parts by weight of non-ionic monomer into 50 to 60 parts by weight of water, stirring and dissolving, adjusting the pH value to 8.5 to 9.5 to obtain an aqueous phase solution;
   3) adding the aqueous phase solution into the oil phase mixed solution, and then adding 0.10 to 0.15 parts by weight of an initiator therein to cause a polymerization to obtain a high polymer; wherein the mass ratio of the aqueous phase solution to the oil phase mixed solution is 1:2 to 1:2.5;
   4) mixing 32 to 56 parts by weight of fluorocarbon surfactant and 15 to 23 parts by weight of biosurfactant to obtain a surfactant system;
   5) adding 40 to 55 parts by weight of the surfactant system into 30 to 43 parts by weight of the high polymer, and stirring the mixture uniformly to obtain the surfactant that changes the wettability of tight sandstone.

2. The method for preparing a surfactant that changes the wettability of tight sandstone according to claim 1, wherein the polymerization reaction has a temperature of 60 to 75° C. and a duration of 12 to 18 hours.

3. The method for preparing a surfactant that changes the wettability of tight sandstone according to claim 1, wherein the emulsifier is one or more of fatty acid monoglyceride, lauric acid monoglyceride, propylene glycol fatty acid ester; the solvent oil is one or more of white oil, naphtha, propanol, isopropanol.

4. The method for preparing a surfactant that changes the wettability of tight sandstone according to claim 1, wherein the modified lignosulphonate monomer is sodium hydroxymethyl lignosulphonate, sodium sulfomethylated lignosulphonate, calcium hydroxymethyllated lignosulphonate, 2-acrylamido-2-methylpropanesulfonic acid.

5. The method for preparing a surfactant that changes the wettability of tight sandstone according to claim 1, wherein the hydrophilic cationic monomer is one or more of octylphenol polyoxyethylene ether sodium sulfate, nonylphenol polyoxyethylene ether, amido polyoxyethylene ether magnesium disulfate, dodecyl alcohol polyoxyethylene ether sodium disulfate.

6. The method for preparing a surfactant that changes the wettability of tight sandstone according to claim 1, wherein the non-ionic monomer is one or more of polyoxyethylene glyceryl ether, polyoxypropylene glyceryl ether, methyl polyoxyethylene ether.

7. The method for preparing a surfactant that changes the wettability of tight sandstone according to claim 1, wherein the initiator is one or more of benzoyl peroxide, benzoyl t-butyl peroxide, azobisisobutyronitrile, azobisisoheptonitrile, dimethylazobisisobutyrate.

8. The method for preparing a surfactant that changes the wettability of tight sandstone according to claim 1, wherein the fluorocarbon surfactant is one or more of ethyldimethylammonium 3-polyepoxyhexafluoropropaneamidopropyl (2-sulfite), sodium perfluoropropylalkylsulfonate, perfluoroalkyl carboxylic acid amide alkyl carboxylic acid sodium, perfluorooctane sulfonic acid tetraethylamine amide; the biosurfactant is one or more of sophorolipid, rhamnolipid, trehalose lipid.

* * * * *